(12) United States Patent
Harris et al.

(10) Patent No.: US 8,127,919 B2
(45) Date of Patent: Mar. 6, 2012

(54) SCISSORS LIFT GUARD FOR A SHEET MATERIAL CONVEYOR

(75) Inventors: Richard D. Harris, Indianapolis, IN (US); Achie B. Russell, Connersville, IN (US)

(73) Assignee: Systec Corporation, Indianapolis, IN (US)

( * ) Notice: Subject to any disclaimer, the term of this patent is extended or adjusted under 35 U.S.C. 154(b) by 141 days.

(21) Appl. No.: 12/724,033

(22) Filed: Mar. 15, 2010

(65) Prior Publication Data
US 2011/0220454 A1   Sep. 15, 2011

(51) Int. Cl.
*B65G 13/00*   (2006.01)
(52) U.S. Cl. ............... 198/861.1; 198/860.3; 193/35 TE
(58) Field of Classification Search ............ 193/35 TE; 198/860.1, 860.3, 860.5, 861.1
See application file for complete search history.

(56) References Cited

U.S. PATENT DOCUMENTS

| | | | | |
|---|---|---|---|---|
| 966,488 A * | 8/1910 | Torseth | ....................... | 198/860.3 |
| 1,696,456 A * | 12/1928 | Sebring | ....................... | 220/215 |
| 2,837,203 A * | 6/1958 | Reeser | ....................... | 198/860.5 |
| 3,787,039 A * | 1/1974 | Zeichman | ....................... | 269/13 |
| 4,393,969 A * | 7/1983 | Woell | ....................... | 193/35 TE |
| 4,685,269 A * | 8/1987 | Marchetti | ....................... | 53/167 |
| 4,715,488 A * | 12/1987 | Hewitt et al. | ............... | 193/35 R |
| 4,744,702 A * | 5/1988 | Wiseman et al. | ............... | 406/88 |
| 5,325,953 A * | 7/1994 | Doster et al. | .................. | 198/304 |
| 5,490,592 A * | 2/1996 | Best et al. | ..................... | 198/812 |
| 5,636,728 A * | 6/1997 | Best et al. | ..................... | 198/782 |
| 5,682,977 A * | 11/1997 | White | ........................ | 198/860.5 |
| 5,947,266 A * | 9/1999 | Rionde | ....................... | 198/860.3 |
| 6,003,658 A * | 12/1999 | Best et al. | ..................... | 198/588 |
| 6,155,381 A * | 12/2000 | White et al. | .................... | 186/68 |
| 6,357,705 B1 * | 3/2002 | Hackett | ....................... | 248/163.2 |
| 6,397,999 B1 * | 6/2002 | Taylor | ........................ | 193/35 TE |
| 6,447,044 B1 * | 9/2002 | Buker et al. | ................. | 296/99.1 |
| 6,851,539 B2 * | 2/2005 | Flippo et al. | .............. | 193/35 TE |
| 6,905,095 B1 * | 6/2005 | Gruzdeva et al. | .......... | 244/137.1 |
| 7,455,164 B2 * | 11/2008 | Zeigler | ....................... | 193/35 TE |
| 7,819,363 B2 * | 10/2010 | Johnson et al. | ............. | 244/137.1 |
| 7,896,451 B2 * | 3/2011 | Walsh | ........................ | 312/228.1 |
| 2006/0104760 A1 * | 5/2006 | Cecil et al. | | |

* cited by examiner

*Primary Examiner* — Douglas Hess
(74) *Attorney, Agent, or Firm* — Maginot, Moore & Beck, LLP

(57) ABSTRACT

A conveyor lift table for a conveyor system comprises a conveyor including a frame and a plurality of rollers for supporting a load thereon and a lift mechanism connected to one end to said frame and configured to move the conveyor with a load supported thereon from an uppermost position to a lowermost position. A guard assembly is provided that includes plurality of U-shaped panel sections, each of the panel sections defining a successively larger perimeter. The panel section having the smallest perimeter is attached to the conveyor frame. Each panel section is connected to the next larger perimeter panel section by a plurality of slide members so that the guard assembly is configured to telescopically completely enclose the lift mechanism on three sides as it moves between its uppermost and lowermost positions.

17 Claims, 10 Drawing Sheets

SCISSORS LIFT GUARD FOR A SHEET MATERIAL CONVEYOR

BACKGROUND

The present invention relates to conveyor systems for stacking and transporting sheet material, and more particularly to lift sections of the conveyor system.

Conveyors play a critical role in the packaging and transport of sheet material, such as corrugated sheet material. Conveyors carry the newly manufactured sheet to various stations where stacks of sheets are formed and eventually loaded onto pallets for shipment. In order to optimize control over the sheets and stacks of sheets, many conveyors incorporate powered drive rollers to propel and direct the product.

In some conveyor systems, loads are formed on a conveyor section that can be raised and lowered. This conveyor section, commonly called a lift table, is an ergonomic solution for manual load forming. The lift table is initially elevated to a comfortable work height allowing an operator to manually transfer a bundle of sheet material onto the conveyor surface without bending. As each tier is positioned on the lift table, the table is lowered so that the new work surface is again at a comfortable working height. As new tiers of sheet material are added the lift table is progressively lowered until the maximum load is reached. The lift table is then raised so that the entire newly formed load is aligned with a discharge conveyor.

Thus, as shown in FIGS. 1-2, a conveyor system 10 includes a unit load station 15 and a discharge conveyor 11 adjacent each other. The unit load station includes a conveyor lift table assembly 20 flanked by retractable backstops B adjacent two sides of the lift table assembly. The backstops may be extended into a position contiguous with the sides of the lift table to facilitate load building. Once the load is fully built it can be discharged away from the lift table assembly 20 on the conveyor 11.

The lift table assembly 20 includes a conveyor 22, which may be a roller-type conveyor with rollers 24 arranged to support the sheet material load as it is built. Once the load is complete the rollers facilitate transferring the load to the discharge conveyor 11. The conveyor 22 includes a frame 26 supporting the rollers 24 and providing an interface to the lift mechanism 30. The lift mechanism is typically a scissors-type mechanism with two arms 32 and 36. The arm 32 is pivotably supported at a mount 33 on a base 46 supported on a floor. The opposite end of the arm carries a roller 34 that is adapted to roll on the underside of the conveyor frame 26. The other arm 36 is pivotably supported at one end on a mount 37 on the underside of the conveyor frame 26. The opposite end of the arm 36 carries a roller 38 that rolls on the base 46. The two arms are pivotably attached at a fulcrum point 39 to permit the scissors motion of the two arms. The arms are activated by a drive member 40, which may be in the form of a pneumatic or hydraulic cylinder. The drive member 40 is pivotably supported at a mount 44 on the base 46, while the push rod 42 of the drive member is pivotably connected to one of the arms 36 between its pivot mount 37 and the fulcrum 39. Extension of the push rod 42 causes the lift mechanism 30 to retract while retraction of the push rod causes the mechanism to extend or rise.

Although the scissors lift mechanism is an inexpensive and simple means to raise and lower the conveyor lift table 20, it carries with it the risk of objects or personnel entering the cavity beneath the conveyor 22 during operation of the lift mechanism. Typically a vinyl skirt extends from the conveyor 22 to provide a visual warning to stay clear of the area under the conveyor. The skirt may also prevent entry of light-weight objects. However, the skirt does not prevent an operator from moving his/her leg or foot under the conveyor, and does not prevent more massive articles from sliding or rolling underneath during operation. Consequently, there is a need for a system to protect the area underneath the conveyor 22 during operation of the lift table.

SUMMARY

In order to meet this need, a conveyor lift table for a conveyor system is provided comprising a conveyor including a frame and a plurality of rollers for supporting a load thereon and a lift mechanism connected to one end to the frame and at an opposite end to a base. The lift mechanism is configured to move the conveyor with a load supported thereon from an uppermost position to a lowermost position. In one aspect, the conveyor lift table further comprises a guard assembly including a plurality of U-shaped panel sections, each of the panel sections defining a successively larger perimeter. The panel section having the smallest perimeter is attached to the conveyor frame. Each panel section is connected to the panel section having the next larger perimeter by a plurality of slide members configured to permit relative sliding movement between adjacent panel sections. The guard assembly is thus configured so that the plurality of panel sections slide telescopically to completely enclose the lift mechanism on three sides as it moves between its uppermost and lowermost positions.

In one feature, each panel section includes three Z-shaped panels, each having a length related to a length of a side of the conveyor. Two corner brackets are fastened between adjacent ones of the panels to form the U-shaped panel section. The Z-shape of each panel includes an inwardly directed ledge at an upper edge of the panel and an outwardly directed ledge at an opposite lower edge thereof. The outwardly directed ledge of a lower one of adjacent panel sections is arranged to overlap the inwardly directed ledge of an upper one of adjacent panel sections. This overlap maintains the integrity of the guard assembly and operates to pull the adjacent panel section up as the lift mechanism is actuated. The inwardly directed ledge of each panel may define an opening to receive a corresponding one of the plurality of slide members therethrough.

A lowermost one of the panel sections may include a number of shims mounted thereto. The shims define at least one conduit beneath the lowermost panel section for passage of wires, tubes and the like.

DETAILED DESCRIPTION

Figure 1:
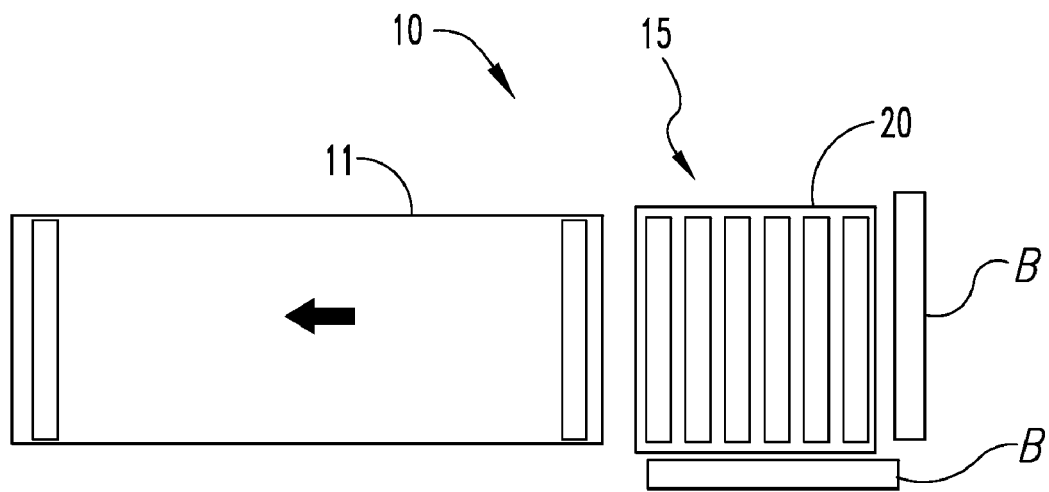
FIG. 1 is a schematic representation of a conveyor assembly having a unit load station.
Figure 2:
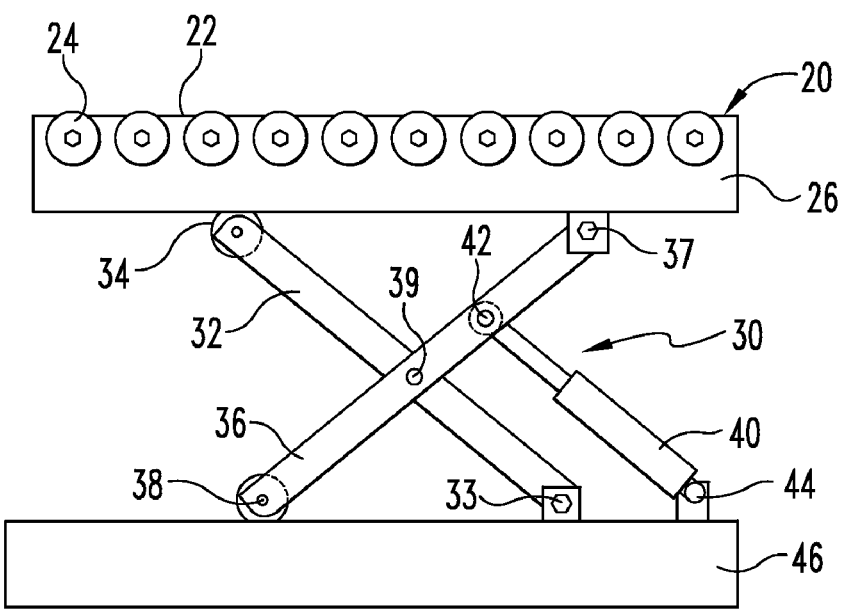
FIG. 2 is a side view of a conveyor lift table assembly incorporated into the unit load station shown in FIG. 1.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 3:
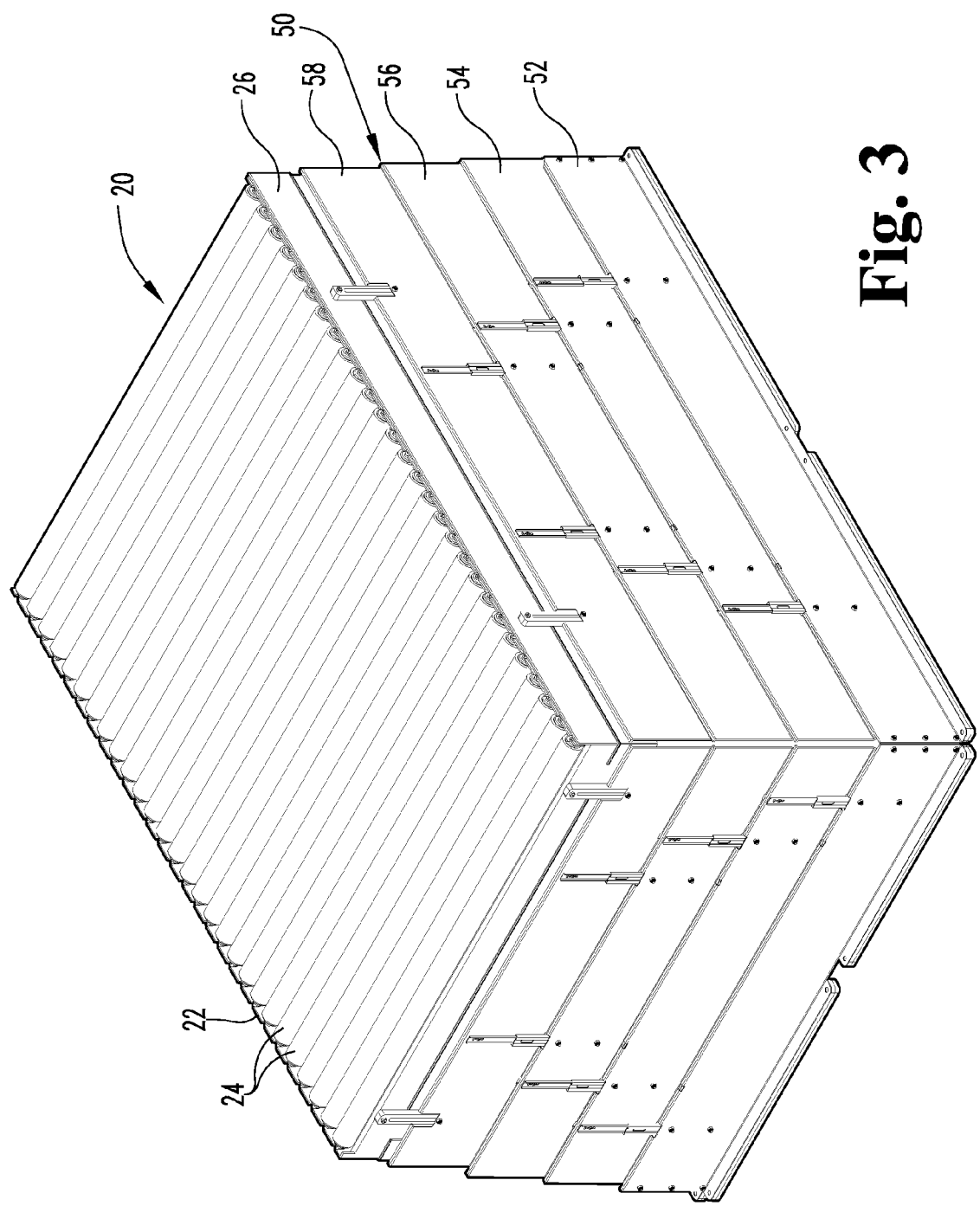
FIG. 3 is a perspective view of a conveyor lift table assembly according to the present disclosure.
Figure 4:
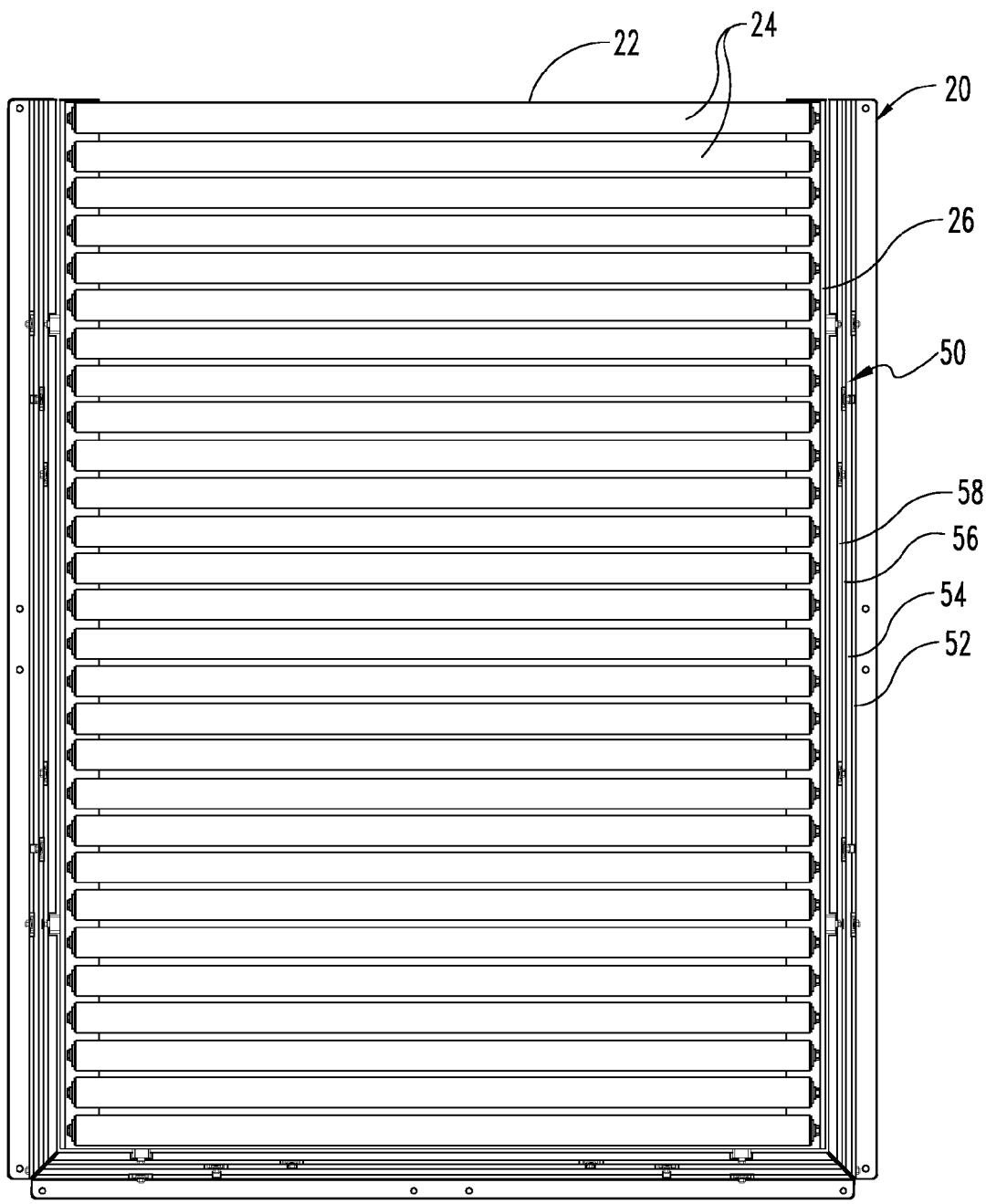
FIG. 4 is a top elevational view of the conveyor lift table assembly shown in FIG. 3.
Figure 5:
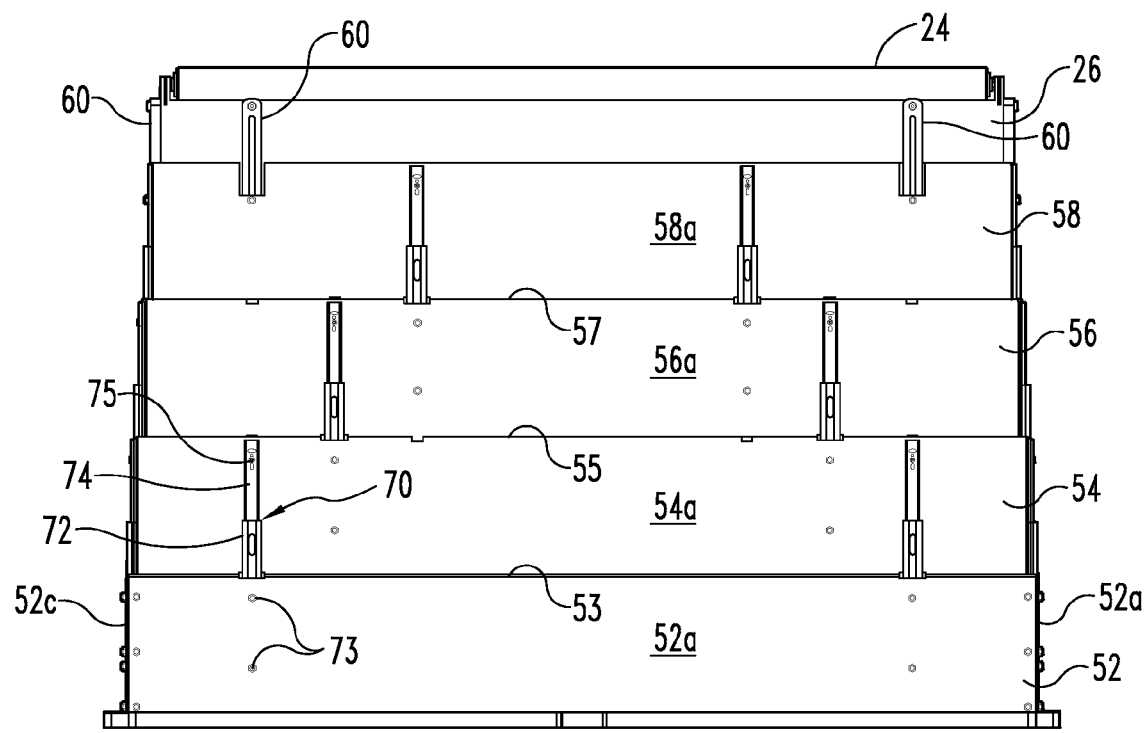
FIG. 5 is a front elevational view of the conveyor lift table assembly shown in FIG. 3.
Figure 8:
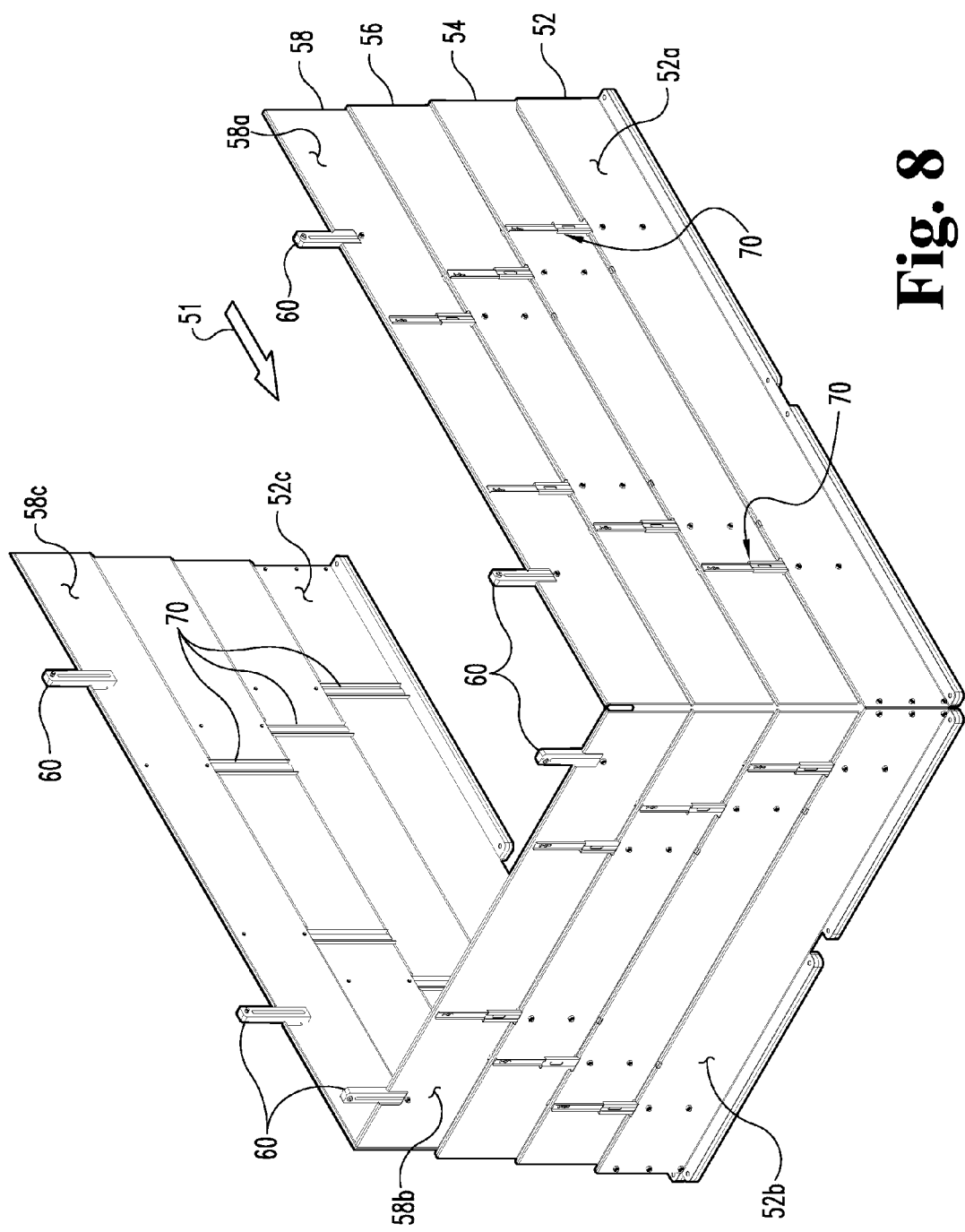
FIG. 8 is a perspective view of the lift guard in its fully extended configuration.

In one embodiment shown in FIGS. 3-5, a conveyor lift a table assembly 20 includes a guard assembly 50 that is configured to raise and lower with the conveyor 22 under operation of the lift mechanism 30. The guard assembly 50 includes a series of telescoping sections 52, 54, 56 and 58 that extend from the floor to the conveyor 22. Each telescoping section is configured to form a U-shaped opening 51, as best seen in FIGS. 4 and 8. Thus, section 52, for example, includes three panels 52a, 52b and 52c that are connected to form the U-shape. Each of the other guard sections 54, 56 and 58 also include corresponding panels a, b, and c. The U-shaped guard assembly 50 thus encircles the conveyor 22 and lift mechanism 30 on three sides. This configuration allows the guard assembly 50 to be readily and easily used with an existing lift table assembly. The opening 51 also accommodates structure and/or mechanisms spanning between the lift table 20 and the discharge conveyor 11.

The uppermost guard section 58 is sized to closely abut the sides of the conveyor frame 26. The next successively lower guard section 56 defines a perimeter greater than the perimeter of the uppermost section 58, and is sized so that the U-shape of the section 56 closely abuts the sides of the uppermost section 58. Similarly, the perimeter of the next section 54 is slightly greater and the perimeter of the lowermost section 52 is greater still. Thus, the guard sections 52-58 are sized for telescoping movement to and from the collapsed and extended configurations.

Figure 6:
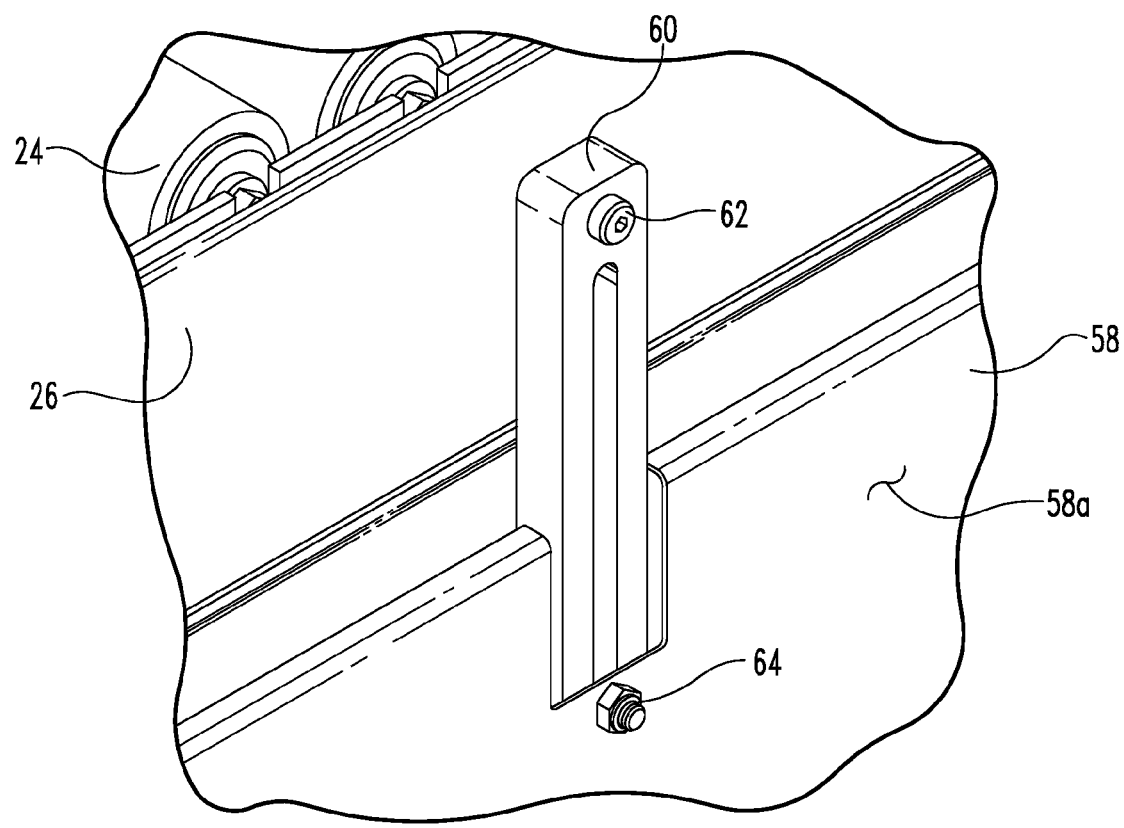
FIG. 6 is an enlarged perspective view of a mounting block used to mount the conveyor to the lift guard of the lift table assembly shown in FIG. 3.

The uppermost section 58 of the guard assembly 50 is connected to the frame 26 of the conveyor by mounting blocks 60, shown in detail in FIG. 6. The mounting blocks are affixed to the frame 26 by shoulder bolts 62, and are affixed to the guard section panel 58a by a corresponding bolt 64. As shown in FIG. 8, two such mounting blocks 60 are provided on each side 58a, 58b and 58c. In one embodiment, the mounting blocks are UHWM/PE or similar material. The mounting blocks 60 are preferably configured to permit a limited amount of swivel relative to each guard section. As the conveyor 22 is raised or lowered by the lift mechanism 30, the conveyor is typically not fully level throughout the movement. Thus, the mounting blocks allow some play between the conveyor and the guard sections as they telescope upward or downward, thereby eliminating any binding between guard sections.

Figure 7:
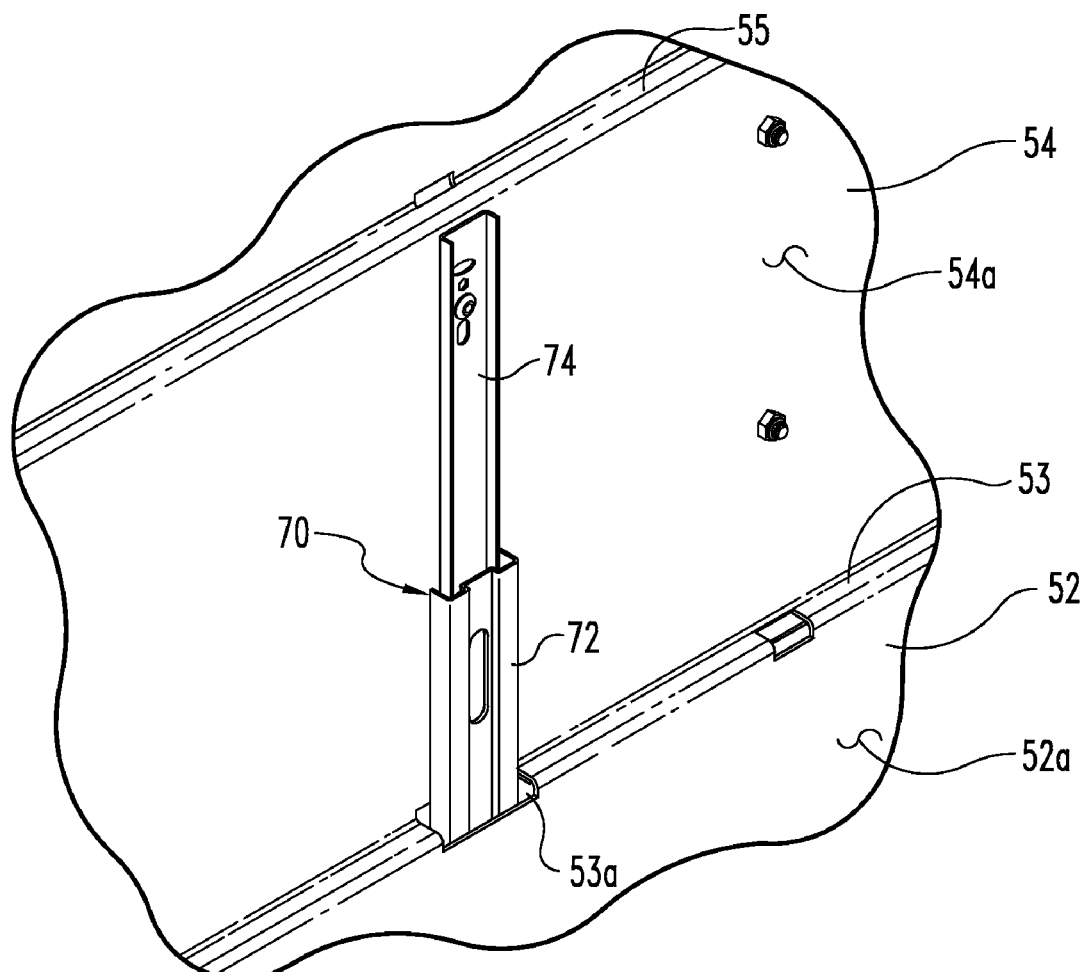
FIG. 7 is an enlarged perspective view of a slide bearing used to assemble the lift guard of the lift table assembly shown in FIG. 3.

The guard assembly sections 52, 54, 56 and 58 are connected consecutively by an array of slide member 70, as shown in FIG. 5 and in detail in FIG. 7. The slide members include a lower slide component 72 that is fastened to a panel of the lowermost of the adjacent connected sections, in this case panel 52a of section 52, and an upper component 74 fastened to the uppermost of the adjacent sections, in this case panel 54a of section 54. The two slide components 72, 74 are configured for sliding engagement and may incorporate an interlocking interface, such as a complementary groove and tab, or rail and track configurations. The slide members 70 may incorporate ball bearings or rely upon a greased interface for smooth sliding between the components. The slide components 72, 74 are sized so that the guard sections are fully deployed at the limit of extension of the upper component 74 relative to the lower component 72.

Each panel includes ledge, such ledges 53 and 55 shown in FIG. 7. The ledges define an opening, such as opening 53a, through which the lower component 72 of each slide member 70 extends. The ledges thus define clearance for the lower components 72 to be disposed within the lowermost one of the adjacent connected sections. The ledges 53, 55 also provide stability for the interface between adjacent guide sections in their fully extend configuration, as shown in FIG. 8. It is further contemplated that each section panel is provided with a ledge at the lower edge of the panel that is overlapped by one of the ledges shown in FIG. 7. In other words, each panel, such as panel 52a, is in a Z-shape, with the ledge 53 forming the top of the Z-shape and a lower ledge, such as ledge 80 in FIG. 10, forming the bottom of the Z. Each panel is preferably identically configured so that the lower ledge is overlapped by the upper ledge. This overlap allows each guide section to "catch" the next section and pull it upward as the lift mechanism 30 is actuated. The Z-shape of each panel also adds rigidity to the panels, especially when the panels are fastened together as described below.

Figure 10:
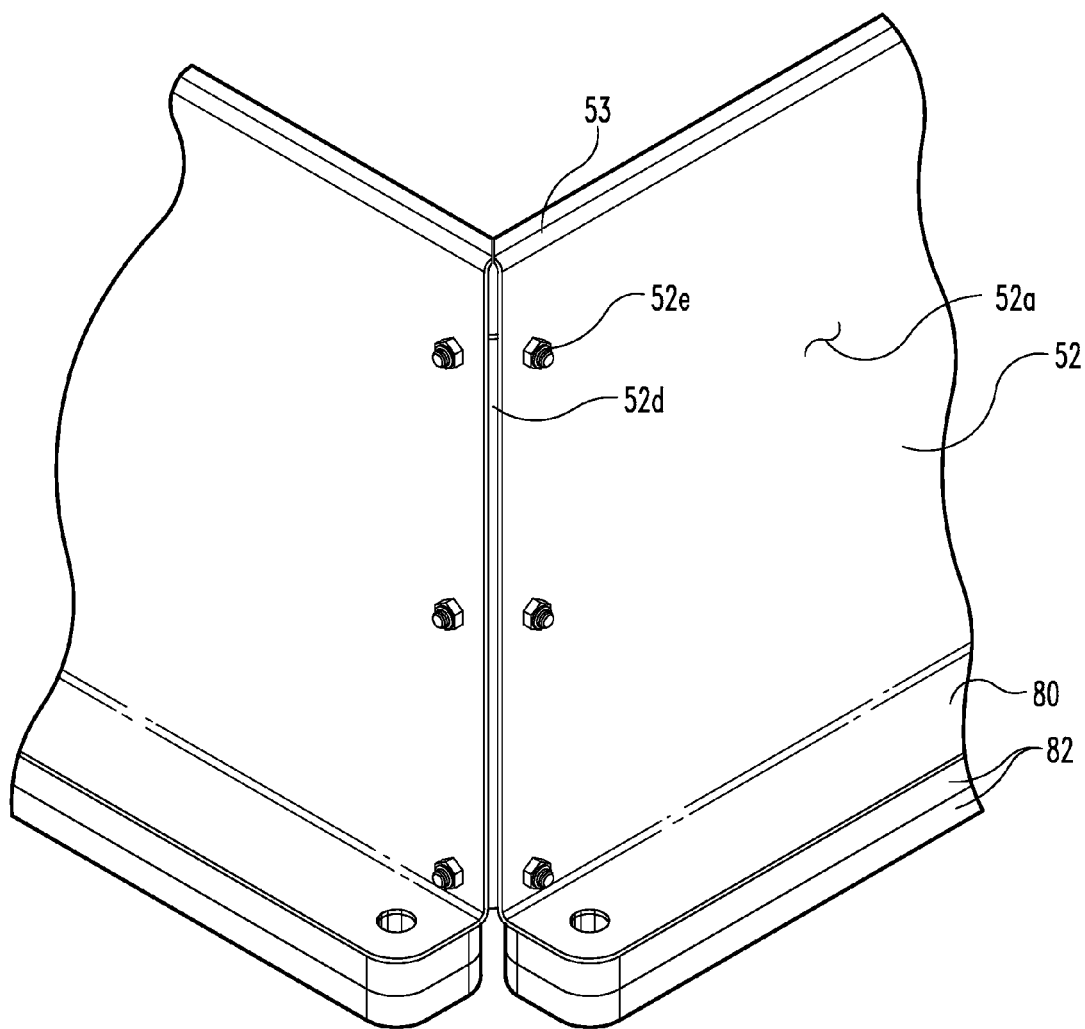
FIG. 10 is an enlarged perspective view of a portion of the lift guard.

As further shown in FIG. 10, each guide section is formed by three identical Z-shaped panels that are fastened at the three corners to form the overall U-shape of the guard assembly 50. In particular, a right-angle or corner bracket 52d is fastened to adjacent panels 52a and 52b by bolts 52e. A corner bracket 52d is provided at each corner of the U-shape. A rubber or foam edge guard may be affixed at each corner to cover any sharp edges of the section panels.

Figure 11:
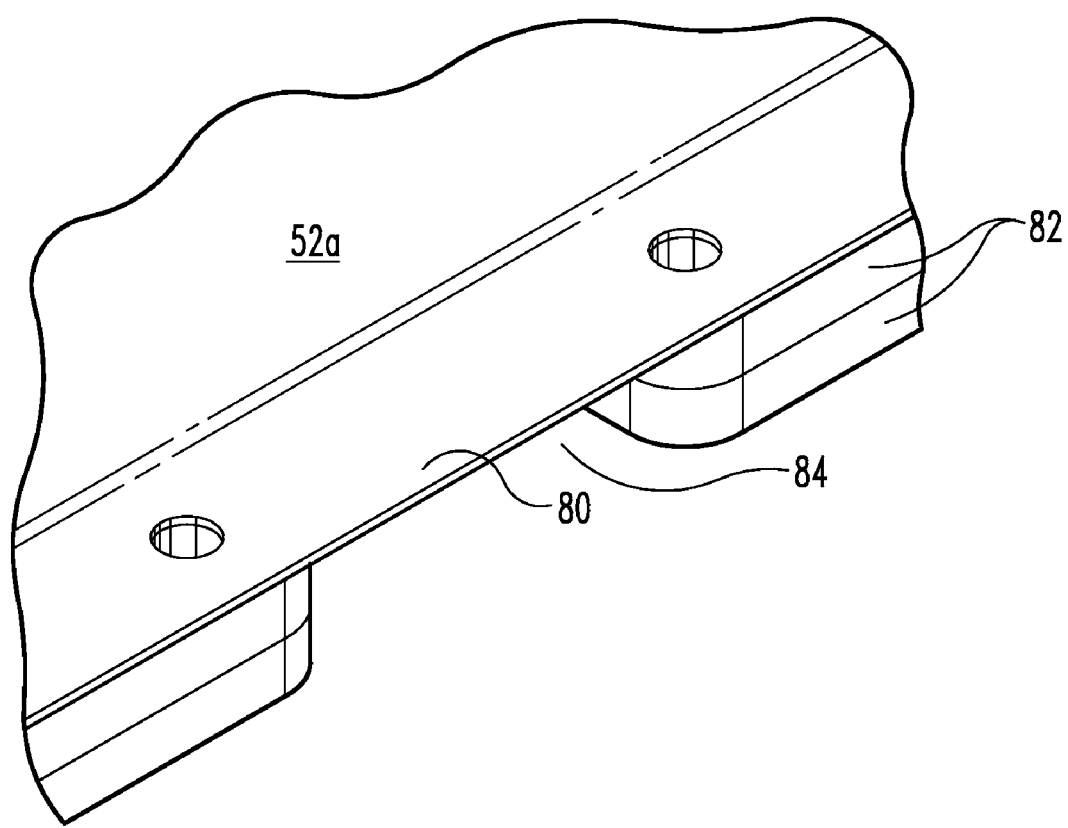
FIG. 11 is an enlarged perspective view of the shim structure of the lift guard.

As further depicted in FIG. 10, as well as in FIG. 11, the ledge 80 of the lowermost guard section 52 supports shims 82 that are used to define conduits 84 for passage of wiring or hoses used by the lift table 20.

Figure 9:
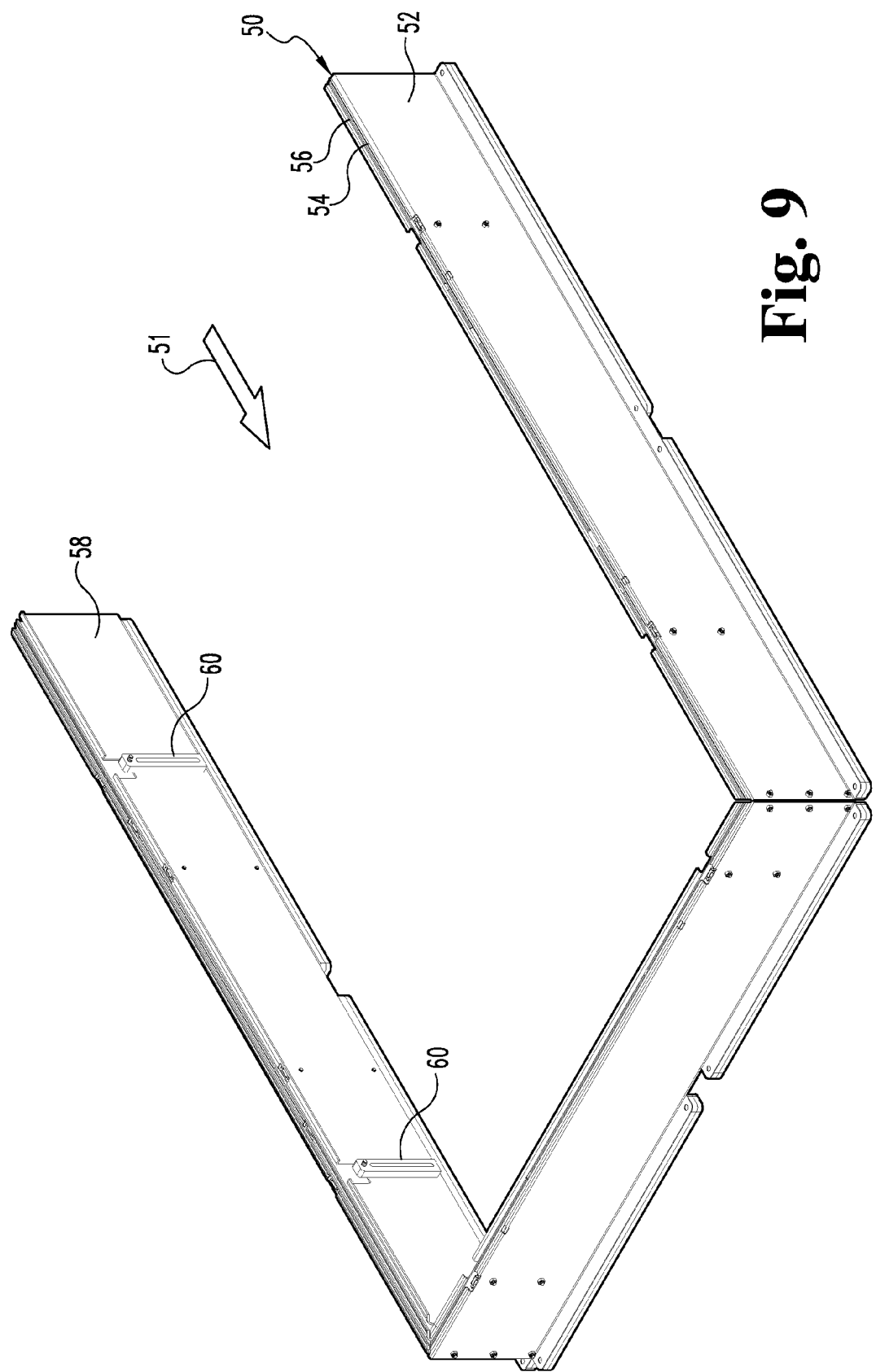
FIG. 9 is a perspective view of the lift guard in its fully retracted configuration.

The guard assembly 50 is capable of telescoping between the fully extended configuration shown in FIG. 8 and the completely collapsed configuration shown in FIG. 9. The slide members 70 are configured for low friction movement so that each section 52, 54, 56 and 58 moves without binding between the extended and collapsed configurations.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A conveyor lift table for a conveyor system comprising:
a conveyor including a frame and a plurality of rollers for supporting a load thereon;
a lift mechanism connected to one end to said frame and at an opposite end to a base, said lift mechanism configured to move said conveyor with a load supported thereon from an uppermost position to a lowermost position;
a guard assembly including;

at least two U-shaped panel sections, each of said panel sections defining a successively larger perimeter;

the panel section having the smallest perimeter being attached to said conveyor frame; and each panel section being connected to the panel section having the next larger perimeter by a plurality of slide members configured to permit relative sliding movement between adjacent panel sections, wherein said guard assembly is configured so that said panel sections slide relative to each other to completely enclose said lift mechanism on three sides as it moves between its uppermost and lowermost positions.

2. The conveyor lift table of claim 1, wherein each panel section includes:

three Z-shaped panels, each having a length related to a length of a side of said conveyor; and two corner brackets fastened between adjacent ones of said panels to form the U-shaped panel section, wherein the Z-shape of each panel includes an inwardly directed ledge at an upper edge of said panel and an outwardly directed ledge at an opposite lower edge thereof, said outwardly directed ledge of a lower one of adjacent panel sections arranged to overlap said inwardly directed ledge of an upper one of adjacent panel sections.

3. The conveyor lift table of claim 2, wherein said inwardly directed ledge of each panel defines an opening to receive a corresponding one of said plurality of slide members therethrough.

4. The conveyor lift table of claim 1, wherein a lowermost one of said panel sections includes a number of shims mounted thereto, said shims defining at least one conduit beneath said lowermost panel section.

5. The conveyor lift table of claim 1, the guard assembly further including:

a plurality of mounting blocks configured to attach said panel section having the smallest perimeter to the conveyor frame, wherein said plurality of mounting blocks are configured to swivel relative to said at least two U-shaped panel sections.

6. A guard assembly for a conveyor lift table of a conveyor system, the lift table having a frame vertically displaceable between an uppermost and a lowermost position, the guard assembly comprising:

a first panel section; and a second panel section coupled to said first panel section, wherein said first panel section is configured for connecting to the frame of the conveyor lift table, wherein said first and said second panel sections are configured to telescopically move relative to each other as the conveyer lift table moves between the uppermost position and the lowermost position, and wherein said first and said second panel sections are configured to enclose three sides of a region below the conveyor lift table.

7. The guard assembly of claim 6, further comprising:

a plurality of mounting blocks configured to connect said first panel section to the frame of the conveyor lift table, wherein said plurality of mounting blocks are configured to swivel relative to said first and said second panel sections as the conveyer lift table moves between the uppermost position and the lowermost position.

8. The guard assembly of claim 6, further comprising:

a plurality of edge guards associated with said first and said second panel sections.

9. The guard assembly of claim 6, further comprising:

a plurality of slide members, each of said slide members including a first component connected to said first panel section, and a second component connected to said second panel section, wherein said first and said second components are configured to slide relative to each other as the conveyor lift table moves between the uppermost position and the lowermost position.

10. The guard assembly of claim 9, wherein:

said first panel section includes a lower ledge, said second panel section includes an upper ledge configured to overlap said lower ledge, said lower ledge defines a plurality of first openings, said upper ledge defines a plurality of second openings, and said second components of said plurality of slide members extend through said plurality of first openings and said plurality of second openings.

11. The guard assembly of claim 6, further comprising:

a plurality of shims mounted to a bottom portion of said second panel section, wherein a conduit is defined between a first one of said plurality of shims and a second one of said plurality of shims.

12. The guard assembly of claim 6, the first and the second panel sections each including:

three Z-shaped panels, each having a length related to a length of a side of the conveyor lift table; and two corner brackets fastened between adjacent ones of said Z-shaped panels, wherein each of said Z-shaped panels includes an inwardly directed ledge at an upper edge thereof and an outwardly directed ledge at an opposite lower edge thereof, and wherein said inwardly directed ledges of said Z-shaped panels of said second panel section are arranged to overlap said outwardly directed ledges of said Z-shaped panels of said first panel section.

13. The guard assembly of claim 12, further comprising:

a plurality of edge guards associated with at least said inwardly directed ledges and said outwardly directed ledges.

14. A guard assembly associated with a conveyor lift table of a conveyor system, the lift table having a frame moveable between an uppermost and a lowermost position, the guard assembly comprising:

at least two U-shaped panel sections, each of said panel sections defining a successively larger perimeter; and a plurality of slide members configured to connect one of the panel sections to another one of the panel sections having the next larger perimeter, wherein the panel section having the smallest perimeter is configured for attachment to the frame of the conveyor lift table, and wherein said panel sections are configured to slide relative to each other and to enclose the conveyor lift table on three sides as the frame of the conveyor lift table moves between the uppermost position and the lowermost position.

15. The conveyor lift table of claim 14, wherein each of the U-shaped panel sections includes:

three Z-shaped panels, each having a length related to a length of a side of the conveyor lift table; and two corner brackets fastened between adjacent ones of said Z-shaped panels to form said U-shaped panel sections, wherein each of said Z-shaped panels includes an inwardly directed ledge at an upper edge thereof and an outwardly directed ledge at an opposite lower edge thereof, said outwardly directed ledge of a lower one of said U-shaped panel sections arranged to overlap said inwardly directed ledge of an upper one of said U-shaped panel sections.

16. The conveyor lift table of claim 15, wherein said inwardly directed ledge of each Z-shaped panel defines an opening to receive a corresponding one of said plurality of slide members therethrough.

17. The conveyor lift table of claim 14, wherein a lowermost one of said U-shaped panel sections includes a number of shims mounted thereto, said shims defining at least one conduit beneath said lowermost panel section.

* * * * *